United States Patent [19]

Umeki et al.

[11] 4,302,510

[45] Nov. 24, 1981

[54] MAGNETIC RECORDING MEDIUM

[75] Inventors: Shinji Umeki; Kazuaki Onuki; Fumio Maruta, all of Tokyo, Japan

[73] Assignee: TDK Electronics Co., Ltd., Tokyo, Japan

[21] Appl. No.: 143,895

[22] Filed: Apr. 25, 1980

Related U.S. Application Data

[63] Continuation of Ser. No. 16,008, Feb. 28, 1979, abandoned.

[30] Foreign Application Priority Data

Mar. 16, 1978 [JP] Japan .................................. 53-30275

[51] Int. Cl.³ .............................................. B32B 5/16
[52] U.S. Cl. ................................ 428/403; 252/62.54; 428/329; 428/694; 428/702; 428/900
[58] Field of Search ............... 428/900, 539, 403, 329, 428/694, 702; 252/62.54; 427/127

[56] References Cited

U.S. PATENT DOCUMENTS

| | | | |
|---|---|---|---|
| 3,958,068 | 5/1976 | Umeki et al. | 428/403 |
| 4,069,367 | 1/1978 | Umeki et al. | 428/403 |
| 4,112,184 | 9/1978 | Umeki et al. | 428/403 |

*Primary Examiner*—Bernard D. Pianalto
*Attorney, Agent, or Firm*—Oblon, Fisher, Spivak, McClelland & Maier

[57] ABSTRACT

A magnetic recording medium having more than 550 Oersted of a coercive force, less than 1.8 of a ratio of a coercive force at $-196°$ C. to a coercive force at 25° C., less than 1.0 wt. % of a content of $Fe^{2+}$ is prepared by incorporating a magnetic powder obtained by dispersing acicular $\gamma$-$Fe_2O_3$ in an aqueous solution of a cobalt salt and reducing it with a reducing agent to deposit a cobalt compound on the acicular $\gamma$-$Fe_2O_3$.

3 Claims, No Drawings

MAGNETIC RECORDING MEDIUM

This is a continuation, of application Ser. No. 16,008, filed Feb. 28, 1979, now abandoned.

BACKGROUND OF THE INVENTION

1. Field of the Invention

The present invention relates to a magnetic recording medium and a process for preparing the same.

2. Description of the Prior Arts

An improvement of a recording density is basical need for a magnetic recording medium. That is, data storing capacity per unit area or unit volume is increased to minimize the magnetic recording medium.

When a smaller size of a magnetic recording medium is prepared by using the conventional magnetic power, a sensitivity is inferior and a frequency characteristic is inferior. A magnetic powder having higher characteristics such as high coercive force and high magnetic flux density is required.

From these viewpoints, a magnetic recording medium having high coercive force is required for high density recording. The coercive force at room temperature (25° C.) of more than 550 Oersted is enough under a consideration of a harmony with a magnetic head.

An orientation is preferably higher and especially higher than 2.0.

There is a problem of a stability. Even though the magnetic characteristics such as coercive force are suitable values, a magnetic recording medium whose magnetic characteristics are unstable to vary depending upon a temperature or a pressure can not be practically used. It is important factor that magnetic characteristics of a magnetic recording medium are stable.

Coercive forces as one of the magnetic characteristics have been studied on a ratio of $Hc^{-196° C.}/Hc^{25° C.}$ wherein $Hc^{-196° C.}$ is a coercive force at $-196°$ C. (boiling point of nitrogen) and $Hc^{25° C.}$ is a coercive force at 25° C. (room temperature), as an index for a temperature dependency.

In general, a coercive force is higher at lower temperature and a ratio of $Hc^{-196° C.}/Hc^{25° C.}$ is higher than 1 and higher ratio shows high temperature dependency whereas lower ratio shows lower temperative dependency. A magnetic recording medium having lower index is preferable from the viewpoint of the temperature stability and a satisfactory ratio of $Hc^{-196° C.}/Hc^{25° C.}$ is less than 1.8 in a practical use.

It has been known to prepare a magnetic recording medium by incorporating cobalt ions and ferrous ions ($Fe^{2+}$) in ferromagnetic iron oxide.

When an amount of $Fe^{2+}$ is larger, a coercive force is increased but the magnetic characteristics become unstable and a transfer effect and an erase effect are deteriorated or a binder is deteriorated by $Fe^{2+}$ to affect physical property of the tape disadvantageously in a practical use.

The inventors have studied on the ranges for preventing troubles in a practical use and have found that an amount of $Fe^{2+}$ should be less than 1.0 wt.% to the other magnetic substances.

The important conditions for the magnetic recording medium are as follows.

① $Hc^{25° C.}$ is more than 550 Oersted.
② A ratio of $Hc^{-196° C.}/Hc^{25° C.}$ is less than 1.8.
③ A content of $Fe^{2+}$ is less than 1.0 wt.%.

According to the studies on these properties of the conventional magnetic recording medium, there is no known magnetic recording medium which has satisfactory properties. The properties of the known magnetic recording media are shown in Table 1.

TABLE 1

| | Co dope $\gamma$-Fe$_2$O$_3$ | Co adsorption $\gamma$-Fe$_2$O$_3$ | Co adsorption Fe$^{2+}$ addition $\gamma$-Fe$_2$O$_3$ |
|---|---|---|---|
| $H^{25° C.}$ (Oersted) | 650 (exp.) | ~500 | 550 to 650 |
| $Hc^{-196° C.}/Hc^{25° C.}$ | 5< | 1.6 | >2.0 |
| Content of Fe$^{2+}$ (%) | 1> | <0.1 | 3 ~ 5 |
| Orientation | 2.0 | 2.0 | 1.9 |

As one magnetic powder having high coercive force and high magnetic flux density, a magnetic powder (Co dope type $\gamma$—Fe$_2$O$_3$) which incorporate a small amount of cobalt in $\gamma$—Fe$_2$O$_3$ magnetic powder has been practically used. However, the magnetic recording medium prepared by using the magnetic powder has remarkably high temperature and pressure dependency of the magnetic characteristics and the condition ② is not satisfactory. Moreover, when the magnetic powder is used for the magnetic recording tape, the transfer effect is disadvantageously high and this is not practically used.

As the other example, an improved cobalt adsorption type $\gamma$—Fe$_2$O$_3$ by modifying said cobalt dope type $\gamma$—Fe$_2$O$_3$ has been known. This has a structure having the surface layer comprising certain cobalt compound formed by adsorbing cobalt ions on acicular $\gamma$—Fe$_2$O$_3$ as cores whereby this has high coercive force resulted by surface anisotropic property. This has stable magnetic characteristics and improved transfer effect. The coercive force can be increased by increasing a content of cobalt ions adsorbed, however the maximum coercive force might be about 500 Oersted. In order to increase coercive force over 500 Oersted, ferrous ions ($Fe^{2+}$) are incorporated as well as cobalt ions in the magnetic powder. Even though the coercive force is increased, the transfer effect and the erase effect are deteriorated to cause unstable magnetic characteristics and the properties of the binder are deteriorated and the characteristics are adversely affected by the incorporation of ferrous ions.

Thus, the conventional magnetic recording media had various disadvantages on the transfer effect, erase the effect, the properties, the stability and the orientation.

SUMMARY OF THE INVENTION

It is an object of the present invention to provide a magnetic recording medium having high coercive force (more than 550 Oersted of $Hc^{25° C.}$), high orientation factor (more than 2.0 of orientation), high temperature stability (1.6-1.7 of a ratio of $Hc^{-196° C.}/Hc^{25° C.}$ and only small content of $Fe^{2+}$ which adversely affect to various characteristics (less than 1.0 wt.%) which has improved physical properties in comparison with those of the conventional ones.

The foregoing objects have been attained by providing a magnetic recording medium having said characteristics by incorporating a magnetic powder obtained by dispersing acicular $\gamma$—Fe$_2$O$_3$ in an aqueous solution of a cobalt salt and reducing it with a reducing agent to deposit a cobalt compound on the acicular $\gamma$—Fe$_2$O$_3$.

DETAILED DESCRIPTION OF THE PREFERRED EMBODIMENTS

The comparisons of the magnetic characteristics of the recording medium of the present invention and the known ones will be shown in Table 2.

TABLE 2

|  | Invention | Co dope $\gamma$-Fe$_2$O$_3$ | Co adsorption type $\gamma$-Fe$_2$O$_3$ | Co adsorption Fe$^{2+}$ addition $\gamma$-Fe$_2$O$_3$ |
|---|---|---|---|---|
| Hc$^{25°\ C.}$ (Oe) | 550–580 | 650 | –500 | 550–650 |
| Hc$^{-196°\ C.}$/Hc$^{25°\ C.}$ | 1.6–1.7 | >5.0 | 1.6 | >2.0 |
| Content of Fe$^{2+}$ (%) | <1.0 | <1.0 | <0.1 | 3–5 |
| Orientation | 2.1–2.3 | 2.0 | 2.0 | 1.9 |

The preparation of the magnetic recording medium of the present invention will be illustrated.

In the present invention, a content of ferrous ions (Fe$^{2+}$) which are considered to affect adversely to a magnetic recording medium is decreased to obtain a magnetic recording medium having high coercive force, high magnetic flux density and high stability.

An acicular $\gamma$—Fe$_2$O$_3$ is thoroughly dispersed in an aqueous solution of a cobalt salt, and a reducing agent such as hydrosulfite, sodium borohydride, hydrazine, hydrazine derivatives, and sodium hypophosphite and a base are admixed to result a reduction. The mixture is heated at lower than 100° C. to react them so as to deposit a cobalt compound on a surface of the acicular $\gamma$—Fe$_2$O$_3$. After the reaction, the magnetic powder is washed with water and filtered and dried.

In order to obtain a uniform reduction, it has been considered to add a chelating agent, however, the addition of a chelating does not contribute to increase the coercive force and it cause to weaken the reducing agent to decrease the coercive force (shown as Reference). Accordingly, a chelating agent is not incorporated in the present invention.

In the present invention, a coercive force of the magnetic powder can be varied depending upon selections of a time of addition of the cobalt salt, a delay of the addition of the reducing agent, after the addition of the base, a concentration of a base, a concentration of a reducing agent and a time for heating.

The magnetic powder is incorporated in a binder and a solvent if necessary with a lubricant to prepare a coating composition which is coated on a substrate such as polyethyleneterephthalate film and dried to cure the binder with a curing agent. The binder can be nitrocellulose and suitable synthetic resins disclosed in the prior arts and the solvent is incorporated to prepare a coatable composition.

The present invention will be further illustrated by certain examples and references which are provided for purposes of illustration only and are not intended to be limiting the present invention.

EXAMPLE 1

14 Grams of cobalt sulfate was dissolved in (liter of water and 100 g of $\gamma$—Fe$_2$O$_3$ was added and dispersed by mixing for 20 minutes by a homomixer, and 400 ml of 6 N—NaOH and 20 g of hydrosulfite as a reducing agent were added to the dispersion to react them for 20 minutes. The mixture was further heated at 100° C. for 2 hours. After the reaction, the product was washed with water and filtered and dried at 70° C. for 8 hours to obtain a magnetic powder.

The magnetic characteristics of the magnetic powder obtained by the process are compared with those of magnetic powders obtained by the similar process without an addition of the reducing agent or only the $\gamma$—Fe$_2$O$_3$. The results are shown in Table 3.

TABLE 3

|  | Example 1 | No addition of reducing agent | $\gamma$Fe$_2$O$_3$ |
|---|---|---|---|
| Coercive force (Oe) | 588 | 496 | 410 |
| Residual magnetic flux density (emu/g) | 37.9 | 35.5 | 35.2 |
| Saturated magnetic flux density (emu/g) | 74.1 | 73.9 | 75.1 |
| Squareness ratio | 0.512 | 0.481 | 0.469 |

EXAMPLE 2

14 Grams of cobalt sulfate was dissolved in 1 liter of water and 100 g of $\gamma$—Fe$_2$O$_3$ was dispersed and 400 ml of 6 N-NaOH and 5 g of hydrosulfite as a reducing agent were added to the dispersion. The mixture was heated at 100° C. for 3 hours under stirring to react them. After the reaction, the product was washed with water and filtered and recovered and dried at 70° C. for 12 hours to obtain a magnetic powder. Magnetic characteristics of the magnetic powder were compared with those of the starting material of $\gamma$—Fe$_2$O$_3$. The results are shown in Table 4.

TABLE 4

|  | Example 2 | $\gamma$-Fe$_2$O$_3$ |
|---|---|---|
| Coercive force (Oe) | 560 | 400 |
| Residual magnetic flux density (emu/g) | 37.0 | 35.4 |
| Saturated magnetic flux density (emu/g) | 74.0 | 75.6 |
| Squareness ratio | 0.496 | 0.468 |

REFERENCE

In accordance with the process of Example 2 except adding a chelating agent (15 g of potassium sodium tartarate) in the step of dispersing $\gamma$—Fe$_2$O$_3$ in the aqueous solution of cobalt sulfate, a magnetic powder was prepared and magnetic characteristics of the magnetic powder were tested. The magnetic characteristics of Reference and Example 2 are shown in Table 5.

TABLE 5

|  | Reference | Example 2 | $\gamma$-Fe$_2$O$_3$ |
|---|---|---|---|
| Coercive force (Oe) | 447 | 560 | 400 |
| Residual magnetic flux density (emu/g) | 35.5 | 37.0 | 35.4 |
| Saturated magnetic flux density (emu/g) | 74.8 | 74.6 | 75.6 |
| Squareness ratio | 0.475 | 0.496 | 0.468 |

EXAMPLE 3

In accordance with the process of Example 1 except adding 2 g of sodium borohydride as a reducing agent and drying for 12 hours, a magnetic powder was prepared and magnetic characteristics were tested. The magnetic characteristics of the magnetic powder are shown in Table 6.

TABLE 6

|  | Example 3 | $\gamma$-Fe$_2$O$_3$ |
| --- | --- | --- |
| Coercive force (Oe) | 566 | 410 |
| Residual magnetic flux density (emu/g) | 37.7 | 35.2 |
| Saturated magnetic flux density (emu/g) | 76.3 | 75.1 |
| Squareness ratio | 0.494 | 0.469 |

EXAMPLE 4

In accordance with the process of Example 1 except adding 3 ml of hydrazine as a reducing agent, the magnetic powder was prepared and magnetic characteristics were tested. The magnetic characteristics of the magnetic powder and the starting material of $\gamma$—Fe$_2$O$_3$ are shown in Table 7.

TABLE 7

|  | Example 4 | $\gamma$-Fe$_2$O$_3$ |
| --- | --- | --- |
| Coercive force (Oe) | 557 | 410 |
| Residual magnetic flux density (emu/g) | 38.3 | 35.2 |
| Saturated magnetic flux density (emu/g) | 76.7 | 75.1 |
| Squareness ratio | 0.499 | 0.469 |

EXAMPLE 5

(1) In a solution of 14 g of cobalt sulfate in 1 liter of water, 100 g of $\gamma$—Fe$_2$O$_3$ was dispersed and 400 ml of 6 N-NaOH and 25 g of hydrosulfite as a reducing agent were added to the dispersion and the mixture was stirred to carry out a reduction. The mixture was heated at 100° C. for 4 hours under stirring to react them. After the reaction, the product was washed with water and filtered and dried at 70° C. for 12 hours to obtain a magnetic powder.

(2) In accordance with the process (1), except heating at 100° C. for 2 hours a magnetic powder was prepared.

(3) In accordance with the process (2) except delaying a time of an addition of hydrosulfite after the addition of sodium hydroxide, a magnetic powder was prepared.

Magnetic characteristics of the magnetic powders and the starting material of Fe$_2$O$_3$ are shown in Table 8.

TABLE 8

|  | Exp. 5 (1) | Exp. 5 (2) | Exp. 5 (3) | $\gamma$-Fe$_2$O$_3$ |
| --- | --- | --- | --- | --- |
| Coercive force (Oe) | 580 | 552 | 568 | 474 |
| Residual magnetic flux density (emu/g) | 37.1 | 37.0 | 37.4 | 36.0 |
| Saturated magnetic flux density (emu/g) | 73.0 | 72.8 | 73.9 | 75.7 |
| Squareness ratio | 0.505 | 0.508 | 0.506 | 0.476 |

As it is clear from the data of Examples, the magnetic powders of the present invention had high coercive force, high magnetic flux density and excellent acicular ratio, magnetic characteristics of magnetic recording tapes prepared by coating each composition comprising each of the magnetic powder and a binder, are shown in Table 9.

TABLE 2

| Sample | 1 | 2 | 3 | 4 | 5(1) | 5(2) | 5(3) |
| --- | --- | --- | --- | --- | --- | --- | --- |
| Coercive force (Oe) | 563 | 558 | 554 | 562 | 577 | 555 | 564 |
| Residual magnetic flux density (gauss) | 1210 | 1240 | 1260 | 1320 | 1290 | 1270 | 1340 |
| Saturated magnetic flux density (gauss) | 1450 | 1500 | 1540 | 1590 | 1560 | 1540 | 1610 |
| Br/Bm | 0.834 | 0.827 | 0.818 | 0.830 | 0.827 | 0.825 | 0.832 |
| Orientation | 2.33 | 2.27 | 2.25 | 2.28 | 2.14 | 2.24 | 2.31 |
| Hc$^{-196°\,C.}$/Hc$^{25°\,C.}$ | 1.62 | 1.62 | 1.67 | 1.69 | 1.74 | 1.60 | 1.65 |
| Fe$^{2+}$ (%) | <0.1 | <0.1 | <0.1 | <0.1 | <0.1 | <0.1 | <0.1 |

As it is clear from the data in Table 9, the magnetic recording media of the present invention are significantly useful as high density magnetic recording medium from viewpoints of high coercive force, high magnetic flux density, high stability and easy orientation since magnetic characteristics of Hc$^{25°}$ C., ratio of Hc$^{-196°}$ C./Hc$^{25°\,C.}$ orientation and content of Fe$^{2+}$ are in the ranges of the present invention.

What is claimed is:

1. A magnetic recording medium having a coercive force greater than 550 Oersteds, a ratio of the coercive force at −196° C. to the coercive force at 25° C. less than 1.8 and having an Fe$^{+2}$ content of less than 1.0 wt.%, comprising: a magnetic powder obtained by dispersing acicular iron oxide in an aqueous solution of a cobalt salt and a reducing agent selected from the group consisting of hydrosulfite, sodium borohydride, hydrazine, hydrazine derivatives, and sodium hypophosphite, said solution being free of a chelating agent; and reacting said cobalt salt with said reducing agent thereby depositing a cobalt compound on the iron oxide base.

2. The magnetic recording medium of claim 1, wherein said reaction of said cobalt salt is conducted in the presence of a base at a temperature less than 100° C.

3. The magnetic recording medium of claim 1, wherein the magnetic powder is prepared by depositing said cobalt compound on acicular $\gamma$—Fe$_2$O$_3$ by reacting said cobalt salt with said reducing agent in the presence of a base.

* * * * *